(12) United States Patent
Rembutsu et al.

(10) Patent No.: US 11,754,227 B2
(45) Date of Patent: Sep. 12, 2023

(54) GAS CHARGING DEVICE

(71) Applicant: ENEOS CORPORATION, Tokyo (JP)

(72) Inventors: Tatsuya Rembutsu, Kakegawa (JP);
Akihiko Fukunaga, Chiyoda-ku (JP);
Toshio Tezuka, Chiyoda-ku (JP); Eiji Negishi, Chiyoda-ku (JP)

(73) Assignee: ENEOS CORPORATION, Tokyo (JP)

( * ) Notice: Subject to any disclaimer, the term of this patent is extended or adjusted under 35 U.S.C. 154(b) by 0 days.

(21) Appl. No.: 17/049,172

(22) PCT Filed: Apr. 26, 2019

(86) PCT No.: PCT/JP2019/017962
§ 371 (c)(1),
(2) Date: Oct. 20, 2020

(87) PCT Pub. No.: WO2019/208776
PCT Pub. Date: Oct. 31, 2019

(65) Prior Publication Data
US 2021/0239272 A1  Aug. 5, 2021

(30) Foreign Application Priority Data

Apr. 27, 2018  (JP) .................................. 2018-086740

(51) Int. Cl.
*F17C 5/06* (2006.01)
*F17C 13/02* (2006.01)

(52) U.S. Cl.
CPC .............. *F17C 5/06* (2013.01); *F17C 13/025* (2013.01); *F17C 2221/012* (2013.01); *F17C 2250/043* (2013.01); *F17C 2265/065* (2013.01)

(58) Field of Classification Search
CPC .... F17C 5/06; F17C 13/025; F17C 2221/012; F17C 2250/043; F17C 2265/065
(Continued)

(56) References Cited

U.S. PATENT DOCUMENTS 6,786,245 B1 * 9/2004 Eichelberger ............. B60S 5/02
141/4
2007/0079892 A1 * 4/2007 Cohen ................... F17C 13/025
141/105
(Continued)

FOREIGN PATENT DOCUMENTS

JP  09-257195 A  9/1997
JP  2004-245277 A  9/2004
(Continued)

OTHER PUBLICATIONS

Society of Automotive Engineers (SAE) Standard J2601 (Year: 2010).*

(Continued)

*Primary Examiner* — Timothy P. Kelly
*Assistant Examiner* — Christopher M Afful
(74) *Attorney, Agent, or Firm* — GREENBLUM & BERNSTEIN, P.L.C.

(57) ABSTRACT

A control device of a gas charging device controls opening/closing of a control valve so that pressure increase rate of gas pressure in a tank when gas charging to the tank increases at a reference increase rate determined in advance. The control device, when gas charge to the tank begins, controls pressure increase rate at a high increase rate higher than the reference increase rate. After the difference between gas pressure in the tank when gas charging is performed at the high increase rate and gas pressure in the tank when the charging is performed at the reference increase rate has reached a predetermined pressure difference, the control device controls the opening/closing of the control valve so that gas charge to the tank is performed at the reference increase rate.

13 Claims, 7 Drawing Sheets

(58) Field of Classification Search
USPC .............................................................. 141/4
See application file for complete search history.

(56) References Cited

U.S. PATENT DOCUMENTS

| | | | |
|---|---|---|---|
| 2009/0107577 A1* | 4/2009 | Allidieres | F17C 7/00 |
| | | | 141/1 |
| 2015/0184804 A1* | 7/2015 | Handa | F17C 13/026 |
| | | | 141/1 |
| 2016/0305611 A1 | 10/2016 | Handa | |
| 2019/0086032 A1 | 3/2019 | Handa | |

FOREIGN PATENT DOCUMENTS

| | | |
|---|---|---|
| JP | 2005-098474 A | 4/2005 |
| JP | 2015-021573 A | 2/2015 |
| JP | 2016-169869 A | 9/2016 |
| JP | 2016-200267 A | 12/2016 |
| JP | 2018-028340 A | 2/2018 |

OTHER PUBLICATIONS

SAE International J2601—Fueling Protocols for Light Duty Gaseous Hydrogen Surface Vehicles, Revised 2014 (Year: 2014).*
Society of Automotive Engineers (SAE) Standard J2601 (2014) (Year: 2014).*
International Search Report, dated Jul. 9, 2019 by the Japan Patent Office (JPO), in International Application No. PCT/JP2019/017962.
Written Opinion of the International Searching Authority, dated Jul. 9, 2019 by the Japan Patent Office, in International Application No. PCT/JP2019/017962.
Extended European Search Report, dated Dec. 13, 2021, from the European Patent Office (EPO), for EP Patent Application No. 19791508.5.

* cited by examiner

GAS CHARGING DEVICE

TECHNICAL FIELD

The present invention relates to a gas charging device that charges a fuel tank of a vehicle with hydrogen gas, for example.

BACKGROUND ART

In general, there is known a gas charging device that charges hydrogen gas to a tank to be charged (a fuel tank) of a vehicle (such as a four-wheeled vehicle) that uses hydrogen gas as its fuel. In this type of gas charging device, high pressure gas is accumulated (stored) in advance in a pressure accumulator using a booster such as a compressor. The gas charging device charges high pressure gas from the pressure accumulator to the fuel tank by adjusting valve opening of a flow regulating valve provided in a gas supply pipeline. In this case, the gas charging device reduces gas charging time by cooling the hydrogen gas with a cooler (a heat exchanger) provided in the gas supply pipeline to suppress a rise in gas temperature in the fuel tank. (Patent Document 1).

PRIOR ART DOCUMENT

Patent Document

Patent Document 1: Japanese Unexamined Patent Application Publication No. 2015-21573

SUMMARY OF THE INVENTION

Incidentally, according to the above-described prior art, during standby, there is a possibility of temperature rise of the gas supply pipeline downstream of the heat exchanger and a charging hose which connects the gas supply pipeline and the fuel tank due to the influence of ambient temperature (outside air temperature). Especially, when outside air temperature is high and time interval between completion of previous gas charging and start of present gas charging is long, there is a possibility that the temperature of the gas supply pipeline and the charging hose may become substantially equal to the outside air temperature. When gas charging is initiated in such a condition, fuel gas cooled by the heat exchanger exchanges heat with the gas supply pipeline and the charging hose whose temperature has risen. Thus, there is a risk of time increase to lower the temperature of fuel gas supplied to the fuel tank to a predetermined temperature.

An object of the present invention is to provide a gas charging device capable of reducing the temperature of fuel gas supplied to the fuel tank more rapidly, thereby to perform charging operation efficiently.

A gas charging device according to one aspect of the present invention is a gas charging device including: a nozzle connected to a pressure accumulator which stores a gas via a gas supply system, the nozzle being intended to charge the gas to a tank to be charged; a control valve provided in the gas supply system to control flow of the gas to the tank to be charged; a cooler provided in the gas supply system for cooling the gas charged to the tank to be charged by the nozzle; a pressure sensor configured to detect either one of a gas pressure in the tank to be charged or a gas pressure downstream of the control valve of the gas supply system; a control device configured to control opening/closing of the control valve so that pressure increase rate of the gas pressure increases at a reference increase rate determined in advance, the gas pressure being detected by the pressure sensor when the tank to be charged is charged; where, when gas charging to the tank to be charged begins, the control device controls the opening/closing of the control valve so that the tank to be charged is gas charged such that the pressure increase rate becomes a high increase rate that is higher than the reference increase rate; and after a difference between the gas pressure detected by the pressure sensor when gas charging at the high increase rate and the gas pressure detected by the pressure sensor when gas charging at the reference increase rate reaches a predetermined pressure difference, the control device controls the opening/closing of the control valve so that the tank to be charged is gas charged at the reference increase rate.

Further, a gas charging device according to one aspect of the present invention is a gas charging device including: a nozzle connected to a pressure accumulator which stores a gas via a gas supply system, the nozzle being intended to charge the gas to a tank to be charged; a control valve provided in the gas supply system to control flow of the gas to the tank to be charged; a cooler provided in the gas supply system for cooling the gas charged to the tank to be charged by the nozzle; a pressure sensor configured to detect either one of a gas pressure in the tank to be charged or a gas pressure downstream of the control valve of the gas supply system; a control device configured to control opening/closing of the control valve so that pressure increase rate of the gas pressure detected by the pressure sensor when the tank to be charged is charged increases at a reference increase rate determined in advance; where, from the time when gas charging to the tank to be charged begins until a predetermined time elapses or until the pressure sensor detects an assumed pressure that is assumed to be detected by the pressure sensor when the predetermined time has elapsed, the control device controls the opening/closing of the control valve so that the tank to be charged is gas charged such that the pressure increase rate becomes a high increase rate that is higher than the reference increase rate; and after the predetermined time has elapsed or after detecting the assumed pressure, the control device controls the opening/closing of the control valve so that the tank to be charged is gas charged at the reference increase rate.

According to the gas charging devices described above, the temperature of fuel gas supplied to the fuel tank can be reduced to a predetermined temperature within a predetermined time after the beginning of fuel gas charge.

MODE FOR CARRYING OUT THE INVENTION

Figure 1:
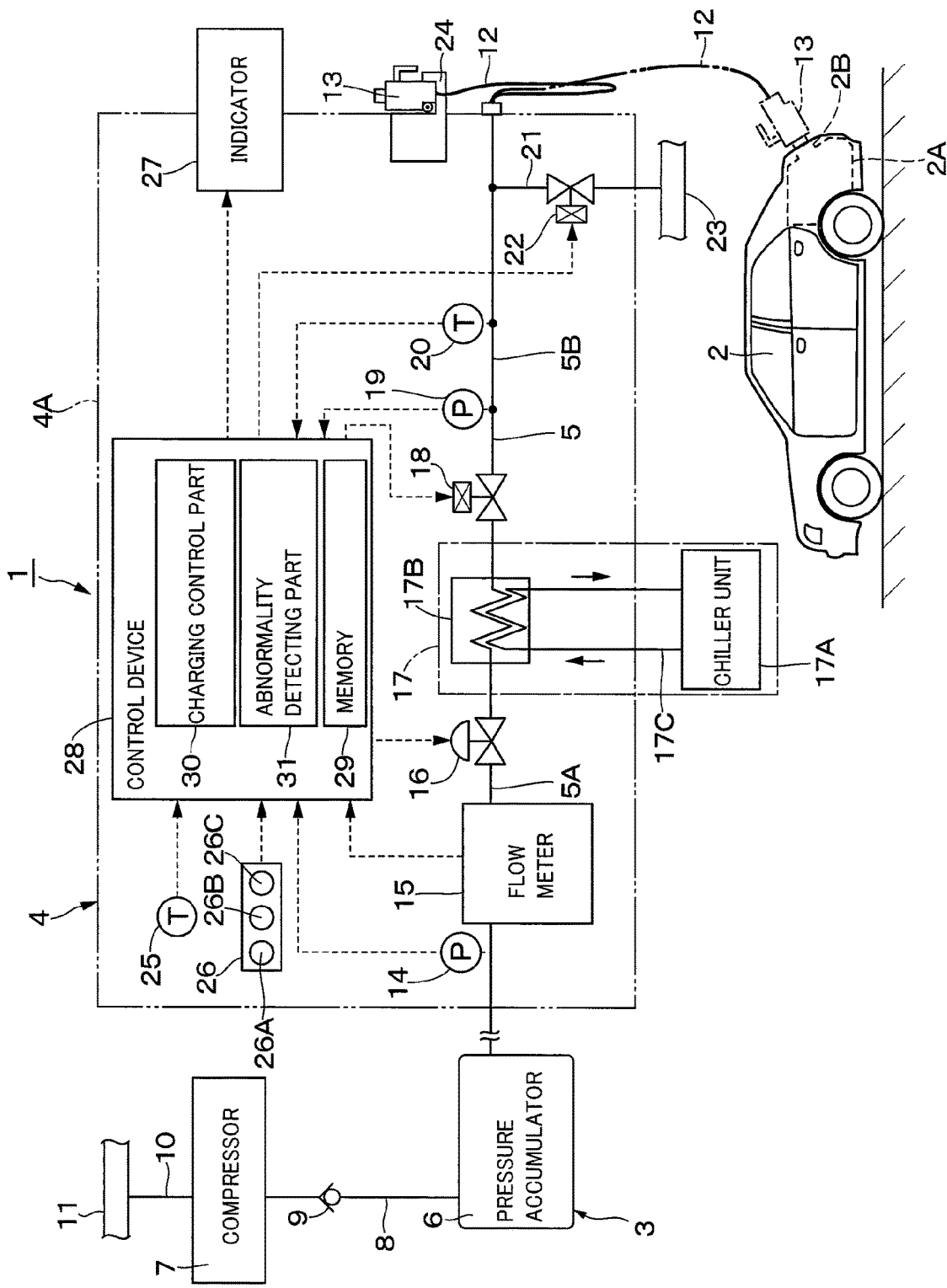
FIG. 1 is an overall configuration diagram schematically showing a gas charging device according to the first embodiment.

The gas charging device according to embodiments will be described below in detail with reference to the accompanying drawings.

FIGS. 1 to 6 show the first embodiment. The gas charging device 1 in FIG. 1 supplies (charges) compressed fuel gas (hydrogen gas in this embodiment) to a fuel tank 2A (tank to be charged) of a vehicle 2, for example. The gas charging device 1 is installed in a facility or the like generally called a gas supply station. The gas charging device 1 is configured to include a gas storage part 3 for storing gas compressed to a high pressure, a dispenser unit 4 for charging and supplying fuel gas from the gas storage part 3 to the fuel tank 2A of the vehicle 2, and a gas supply pipeline 5 which extends from the gas storage part 3 to the inside of a dispenser housing 4A of the dispenser unit 4.

The gas supply pipeline 5 as a gas supply system is installed in the dispenser housing 4A. The gas supply pipeline 5 is supplied with fuel gas pressurized from a pressure accumulator 6. The gas supply pipeline 5 is comprised of an upstream supply pipeline 5A extending from the pressure accumulator 6 to a shutoff valve 18 to be described later and a downstream supply pipeline 5B extending from the shutoff valve 18 to a charging hose 12 to be described later. That is, the upstream supply pipeline 5A has one end (upstream end) side connected to the pressure accumulator 6 and the other end (downstream end) side connected to the shutoff valve 18. On the other hand, the downstream supply pipeline 5B has one end (upstream end) side connected to the shutoff valve 18 and the other end (downstream end) side connected to the charging hose 12.

The gas storage part 3 of the gas charging device 1 is configured to include a pressure accumulator 6 and a compressor 7 as a booster. The pressure accumulator 6 is a container for accumulating high pressure fuel gas compressed by the compressor 7. The pressure accumulator 6 is formed, for example, as a pressure container in which a plurality of cylinders is connected in parallel with one another. The inflow side of the pressure accumulator 6 is connected to the discharge side of the compressor 7 via a gas conduit 8. A check valve 9 is provided in the midway of the gas conduit 8. The check valve 9 prevents fuel gas in the pressure accumulator 6 from flowing back to the gas conduit 8.

The compressor 7 consists of a multi-stage compressor unit that compresses fuel gas in multiple stages, for example. The suction side of the compressor 7 is connected to a suction pipeline 10. The suction pipeline 10 is connected to, for example, an intermediate pressure pipe 11 which communicates with a gas tank that stores hydrogen gas (or a hydrogen generation facility that generates hydrogen gas). The fuel gas which is supplied from the intermediate pressure pipe 11 via the suction pipeline 10 is compressed by the compressor 7. The boosted fuel gas is supplied to the pressure accumulator 6 via the gas conduit 8 and the check valve 9. The pressure accumulator 6 stores high pressure fuel gas boosted by the compressor 7 and accumulates it until full pressure is achieved.

The charging hose 12 is connected to the downstream supply pipeline 5B at its base end side. The charging hose 12 extends to the outside of the dispenser housing 4A. The charging hose 12 constitutes a gas supply system together with the gas supply pipeline 5. On the tip end side of the charging hose 12, a nozzle 13 which is to be connected to a connection port 2B (that is, a receptacle) of the fuel tank 2A mounted on the vehicle 2 is provided.

The nozzle 13 is connected to the pressure accumulator 6 which stores fuel gas via the gas supply pipeline 5 and the charging hose 12. The nozzle 13 charges fuel gas to the fuel tank 2A. That is, for example, in order to supply fuel consisting of hydrogen gas to the fuel tank 2A of the vehicle 2, the nozzle 13 constitutes a charging coupling removably connected to the connection port 2B of the fuel tank 2A in an airtight manner.

The nozzle 13 has a lock mechanism (not shown in the figure) that is releasably locked with respect to the connection port 2B so as not to be accidentally detached from the connection port 2B of the fuel tank 2A due to gas pressure while charging hydrogen gas. As a result, during a state where the nozzle 13 is connected (locked) to the connection port 2B of the fuel tank 2A, high pressure fuel gas (hydrogen gas) in the pressure accumulator 6 can be charged to the fuel tank 2A of the vehicle 2 through the gas supply pipeline 5, the charging hose 12, and the nozzle 13.

The gas supply pipeline 5 in the dispenser housing 4A is provided with a primary pressure sensor 14, a flow meter 15, a flow regulating valve 16, a cooler 17, the shutoff valve 18, a secondary pressure sensor 19 and a temperature sensor 20 in order from the upstream side to the downstream side. Here, the order of installing the flow meter 15, the flow regulating valve 16, the cooler 17, the shutoff valve 18, and the sensors 19, 20 provided from the upstream side to the downstream side of the gas supply pipeline 5 is not limited to the order shown in FIG. 1.

The primary pressure sensor 14 is located on the upstream side of the flow meter 15 and the flow regulating valve 16 and is provided at the upstream supply pipeline 5A. The primary pressure sensor 14 detects gas pressure of fuel gas supplied from the pressure accumulator 6 to the upstream supply pipeline 5A.

The primary pressure sensor 14 outputs a detection signal corresponding to a detected value (a pressure value) to the control device 28.

The flow meter 15 is installed in the upstream supply pipeline 5A. The flow meter 15 is composed of a Coriolis flow meter or the like that measures mass flow rate of fluid to be measured flowing in the gas supply pipeline 5. The flow meter 15 measures the flow rate (mass flow rate) of fuel gas, that is, hydrogen gas flowing in the gas supply pipeline 5 through the flow regulating valve 16 and the shutoff valve 18, etc., for example, and outputs flow rate pulses proportional to the measured flow rate to the control device 28 to be described later.

Thereby, the control device 28 can calculate the amount of fuel (hydrogen gas) charged in the fuel tank 2A of the vehicle 2. As a result, the control device 28 displays the amount of fuel delivered to the vehicle 2 (which corresponds to the amount of supplied fuel) on a display device etc. (for example, an indicator 27 to be described later or other display part), and can inform the customer etc. the displayed amount, for example.

The flow regulating valve 16 is provided in the upstream supply pipeline 5A. The flow regulating valve 16 controls the flow of fuel gas to the fuel tank 2A of the vehicle 2. The flow regulating valve 16 is, for example, an air-operated type, and is a valve device which is opened by supplying air and where valve opening degree is adjusted by controlling pressure (air pressure) by a control signal. The flow regulating valve 16 which is a control valve where its valve opening degree is arbitrarily controlled by a command based on a control program of the control device 28 to be described later, variably controls the flow rate and the gas pressure of fuel gas flowing in the gas supply pipeline 5.

The cooler 17 is a device that cools fuel gas flowing in the gas supply pipeline 5 (upstream supply pipeline 5A). The cooler 17 is configured to include a chiller unit 17A provided outside the dispenser housing 4A and having a refrigerator (not shown) for cooling a refrigerant, a heat exchanger 17B provided at the upstream supply pipeline 5A and located at the downstream side of the flow regulating valve 16, and a refrigerant pipeline 17C for circulating the refrigerant between the refrigerator in the chiller unit 17A and the heat exchanger 17B.

The heat exchanger 17B cools the fuel flowing into the upstream supply pipeline 5A. That is, the heat exchanger 17B is arranged in the midway of the gas supply pipeline 5 in order to suppress temperature rise of the fuel tank 2A of the vehicle 2 charged with fuel gas. The heat exchanger 17B cools fuel gas at a midway position of the gas supply pipeline 5.

The heat exchanger 17B is connected to the chiller unit 17A via the refrigerant pipeline 17C. The chiller unit 17A allows the refrigerant (for example, a liquid containing ethylene glycol or the like) to flow through the refrigerant pipeline 17C and allows the refrigerant to circulate to and from the heat exchanger 17B. As a result, the heat exchanger 17B exchanges heat between the refrigerant and the fuel gas in order to lower the temperature of fuel gas (hydrogen gas) to a specified temperature (for example, $-33°$ C. to $-40°$ C.).

In this case, for example, in the heat exchanger 17B, a first layer in which a large number of refrigerant flow passages (not shown) through which the refrigerant flows and a second layer in which a large number of gas flow passages (not shown) through which fuel gas flows are alternately stacked. That is, the heat exchanger 17B is configured as an integrated type laminated structure heat exchanger in which a plurality of stacked layers is integrally formed. Here, the heat exchanger 17B is not limited to an integrated type laminated structure heat exchanger, and for example, fuel gas may be cooled by arranging a gas supply pipeline in which fuel gas flows into a container filled with a liquefied refrigerant (carbon dioxide). The structure of the heat exchanger 17B is not limited thereto.

The shutoff valve 18 is provided in the gas supply pipeline 5 and controls the flow of fuel gas to the fuel tank 2A of the vehicle 2. The shutoff valve 18 is an air-actuated or an electromagnetic valve device provided at a midway portion of the gas supply pipeline 5 (between the upstream supply pipeline 5A and the downstream supply pipeline 5B). The shutoff valve 18 is opened and closed by a control signal from a control device 28 which is be described later, to supply and shut off fuel gas to the fuel tank 2A.

The secondary pressure sensor 19 is provided on the downstream side of the flow regulating valve 16, the cooler 17, and the shutoff valve 18. That is, the secondary pressure sensor 19 is provided on the charging hose 12 side of the downstream supply pipeline 5B. The secondary pressure sensor 19 detects the gas pressure of fuel gas supplied from the pressure accumulator 6 to the fuel tank 2A of the vehicle 2. The secondary pressure sensor 19 which functions as a pressure sensor measures a gas pressure (pressure value P) in the downstream supply pipeline 5B at the vicinity of the nozzle 13. The secondary pressure sensor 19 outputs a detection signal according to the measured pressure value P to the control device 28.

The temperature sensor 20 is located downstream from the secondary pressure sensor 19 and is provided at the downstream supply pipeline 5B. That is, the temperature sensor 20 is provided on the charging hose 12 side of the downstream supply pipeline 5B. The temperature sensor 20 detects the temperature of fuel gas supplied to the fuel tank 2A of the vehicle 2. The temperature sensor 20 measures the temperature in the downstream supply pipeline 5B near the nozzle 13. The temperature sensor 20 outputs a detection signal corresponding to the measured temperature to the control device 28. Here, the temperature sensor 20 may be provided on the upstream side of the secondary pressure sensor 19.

A depressurization pipeline 21 is located between the shutoff valve 18 and the charging hose 12 and is branched from the midway of the downstream supply pipeline 5B. The depressurization pipeline 21 depressurizes gas pressure from the nozzle 13 side when supply of fuel gas to the fuel tank 2A of the vehicle 2 is completed. Therefore, in the midway of the depressurization pipeline 21, there is provided a depressurization valve 22 composed of an automatic valve such as a solenoid valve or a air driven valve.

The depressurization valve 22 is open-controlled by a signal from the control device 28 when the shutoff valve 18 is closed after gas charging operation to the fuel tank 2A using the nozzle 13 is completed. The depressurization valve 22 is close-controlled after the pressure in the downstream supply pipeline 5B is reduced. When the depressurization valve 22 opens, fuel gas in the downstream supply pipeline 5B is discharged to the diffusion line 23, and pressure of the nozzle 13 is reduced to atmospheric pressure. As a result, connection between the nozzle 13 and the connection port 2B of the fuel tank 2A can be released.

A mounting part 24 is provided to the dispenser housing 4A. The nozzle 13 is mounted to the mounting part 24. The mounting part 24 stores the nozzle 13 when the nozzle 13 is returned after fuel gas charging is completed. In this case, the nozzle 13 is stored to the mounting part 24 while maintaining an airtight state. When charging the fuel tank 2A of the vehicle 2 with fuel, as shown by a chain double-dashed line in FIG. 1, the nozzle 13 is removed from the mounting part 24 and connected to the connection port 2B of the vehicle 2 (the fuel tank 2A).

Then, at a state where the nozzle 13 is connected to the fuel tank 2A, fuel gas in the pressure accumulator 6 is charged to the fuel tank 2A of the vehicle 2 through the gas supply pipeline 5, the charging hose 12, the nozzle 13, etc.

An outside air temperature sensor 25 is provided in the dispenser housing 4A. The outside air temperature sensor 25 detects the ambient temperature of the dispenser housing 4A. The outside air temperature sensor 25 outputs a detection signal according to the detected temperature to the control device 28 described later. A detected value (outside air temperature) of the outside air temperature sensor 25 is used to set a pressure rising rate (APRR) and a target completion pressure (P target) when fuel gas is supplied to the fuel tank 2A of the vehicle 2, for example.

An operation part 26 is provided at the dispenser housing 4A. The operation part 26 is configured to include, for example, a charging start switch 26A, a charging stop switch 26B, and a preset switch 26C. The charging start switch 26A is an operation switch that can be manually operated by, for example, an operator at a fuel supply station. The charging start switch 26A is operated when fuel gas charge is to be started. That is, the charging start switch 26A which is an operation switch to start charging is operated after the nozzle 13 disposed at the tip of the charging hose 12 is connected to the connection port 2B of the fuel tank 2A, in order to initiate gas charging operation (main charging).

The charging stop switch 26B which is an operation switch to stop charging is operated when stopping gas charging work. The charging stop switch 26B is operated when charging is to be stopped during gas charge. Further, the preset switch 26C sets a gas charging amount and a gas pressure before charging the fuel tank 2A with fuel gas. The charging start switch 26A, the charging stop switch 26B, and the preset switch 26C of the operation part 26 output signals according to their operating conditions to the control device 28 to be described later. Then, according to these signals, the control device 28 opens or closes the shutoff valve 18 composed of an automatic valve such as an air-operated type air driven valve or an electromagnetic valve, etc.

The indicator 27 is provided on the dispenser housing 4A at a position which is easy for the operator who performs fuel gas charging operation to visually recognize. The indicator 27 displays information necessary for the charging operation of fuel gas. The indicator 27 displays necessary information by a control signal from the control device 28 when the control device 28 described later is performing charge control based on a charging protocol. The indicator 27 displays, for example, charging condition of fuel gas in the fuel tank 2A of the vehicle 2 (a high increase rate control, a reference increase rate control, fuel gas supply amount, abnormality occurrence, etc.).

The control device 28 which functions as a control device controls the supply of fuel gas to the fuel tank 2A of the vehicle 2 by controlling the flow regulating valve 16 and the shutoff valve 18 (opening/closing control). The control device 28 is configured using, for example, a microcomputer, etc. The input side of the control device 28 is connected to the primary pressure sensor 14, the flow meter 15, the secondary pressure sensor 19, the temperature sensor 20, the outside air temperature sensor 25, the operation part 26, etc. On the other hand, the output side of the control device 28 is connected to the flow regulating valve 16, the shutoff valve 18, the depressurization valve 22, the indicator 27, etc.

The control device 28 has a charging control part 30 and an abnormality detecting part 31. The charging control part 30 performs charge control of fuel gas by a program for gas charge control processing (FIGS. 3 to 6) stored in a memory 29. The abnormality detecting part 31 detects that gas charging to the fuel tank 2A is abnormal when the charging control part 30 is performing charge control and when gas pressure (pressure value) detected by the secondary pressure sensor 19 reaches a predetermined pressure value (for example, an allowable upper limit pressure: Pupper or an allowable lower limit pressure: Plower).

The charging control part 30 of the control device 28 outputs a valve opening signal to the flow regulating valve 16 and the shutoff valve 18 when the nozzle 13 is connected to the connection port 2B of the fuel tank 2A of the vehicle 2 and when the charging start switch 26A of the operation part 26 is turned on (ON), for example. As a result, the flow regulating valve 16 and the shutoff valve 18 are opened, and gas charging operation for supplying fuel gas in the pressure accumulator 6 into the fuel tank 2A is initiated.

Further, the charging control part 30 of the control device 28 monitors measurement results of the flow meter 15, the primary pressure sensor 14, the secondary pressure sensor 19, and the temperature sensor 20, for example, and adjusts the valve opening degree of the flow regulating valve 16, etc. by a predetermined control method (for example, constant pressure increase control method). That is, the charging control part 30 controls the valve opening degree of the flow regulating valve 16 so that the pressure increase rate (rise rate) obtained from the pressure value detected by the secondary pressure sensor 19 when fuel gas is charged matches a predetermined pressure increase (pressure rise) rate.

Thus, the control device 28 can control the pressure and flow rate of fuel gas supplied into the fuel tank 2A in an appropriate state. At this time, the control device 28 calculates charging amount (mass) of fuel by integrating the flow rate pulses obtained from the flow meter 15. The control device 28 stops charging fuel by closing the flow regulating valve 16 and the shutoff valve 18 when the pressure value of fuel gas detected by the secondary pressure sensor 19 reaches the target completion pressure (P target).

Further, when the charging stop switch 26B of the operation part 26 is operated, for example, charging operation is forcibly stopped even when the charging amount or the pressure value of fuel gas has not reached the target. In this case, the flow regulating valve 16 and the shutoff valve 18 are closed by a signal from the control device 28. Then, the control device 28 opens the depressurization valve 22 to release fuel gas in the downstream supply pipeline 5B to the diffusion line 23, depressurizes the downstream supply pipeline 5B and the nozzle 13, and then closes the depressurization valve 22.

The memory 29 of the control device 28 is composed of, for example, a non-volatile memory, RAM, ROM, etc. The memory 29 stores programs for gas charge control processing, etc. shown in FIGS. 3 to 6, for example. Further, the memory 29 stores a look-up table used for determining the reference increase rate (pressure rising rate: APRR) and the target completion pressure (P target).

In the look-up table, the reference increase rate and the target completion pressure are set according to charging pressure classification (for example, 70 MPa class, 35 MPa class, etc.), supplied fuel supply temperature classification (for example, −40° C., −20° C., etc.), and capacity classification of the fuel tank 2A. In this case, the reference increase rate and the target completion pressure are set corresponding to the detected value of the outside air temperature sensor 25 (outside temperature) and the initial pressure (Pc0) inside the fuel tank 2A. The reference increase rate can be obtained from the outside air temperature (environmental temperature) detected by the outside air temperature sensor 25, and by referring to the look-up table. The target completion pressure can be obtained from the outside air temperature and the initial pressure (Pc0) inside the fuel tank 2A.

Figure 2:
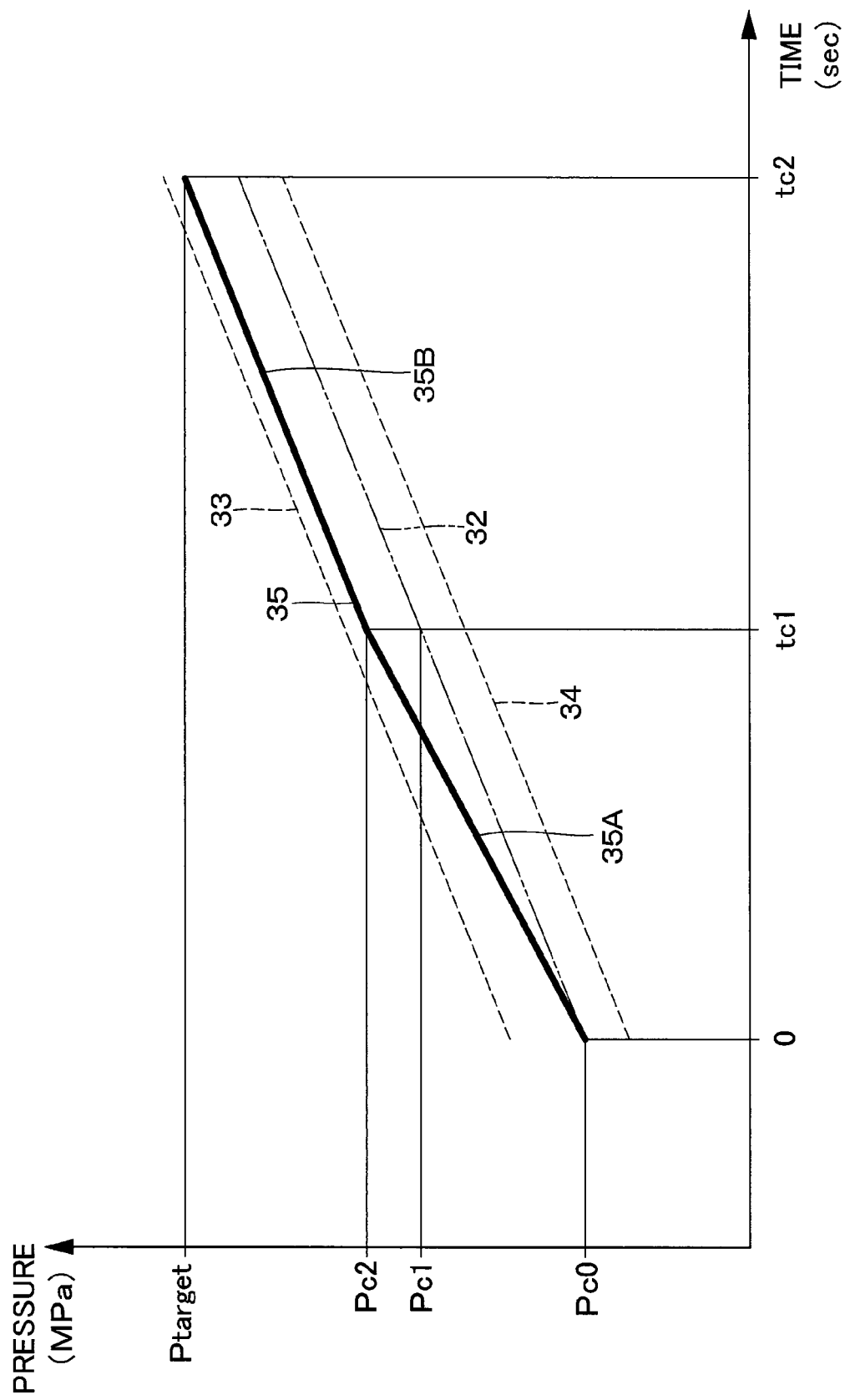
FIG. 2 is an explanatory diagram showing pressure control of gas supply performed by the control device in FIG. 1.

A phantom line 32 shown by a chain double-dashed line in FIG. 2 indicates pressure increase inside the fuel tank 2A if fuel gas were to be supplied to the fuel tank 2A at the reference increase rate from the main charging initial pressure (Pc0) to the target completion pressure (P target) of the fuel tank 2A. Here, the phantom line 32 is shown as having no pressure change during a non-charging time due to switching of pressure accumulator banks (the pressure accumulator 6) etc. during gas charging.

In this case, with regard to pressure increase inside the fuel tank 2A, an allowable range of pressure is set with reference to the reference increase rate. The allowable range of pressure is set, in order to control the pressure of the supplied fuel gas based on the reference increase rate indicated by the phantom line 32, with an allowable upper limit pressure (Pupper) which is the upper limit of pressure to be controlled and an allowable lower limit pressure (Plower) which is the lower limit of pressure to be controlled.

The allowable upper limit pressure and the allowable lower limit pressure correspond to the predetermined pressure values (upper limit side predetermined pressure value, lower limit side predetermined pressure value), respectively. The abnormality detecting part 31 of the control device 28 monitors whether or not the charging pressure (Pm) detected by the secondary pressure sensor 19 is within the allowable range of these pressure values. The abnormality detecting part 31 of the control device 28 detects (determines), for example, whether gas charging is normal or abnormal based on whether or not the charging pressure (Pm) detected by the secondary pressure sensor 19 fluctuates within the allowable range of these pressure values. Then, when abnormality is detected by the abnormality detecting part 31, the charging control part 30 of the control device 28 performs rising rate abnormality processing (increase rate change processing) which switches the high increase rate to the reference increase rate or rising rate abnormality processing (stop processing) which stops gas charging.

The dotted line 33 located on the high pressure side of the phantom line 32 in FIG. 2 indicates the allowable upper limit pressure. The dotted line 33 has a pressure 7.0 MPa higher than that of the phantom line 32, for example. On the other hand, the dotted line 34 located on the low pressure side of the phantom line 32 in FIG. 2 indicates the allowable lower limit pressure. The dotted line 34 has a pressure 2.5 MPa lower than that of the phantom line 32, for example. Here, it should be noted that the allowable upper limit pressure (Pupper) and the allowable lower limit pressure (Plower) are not limited to "7.0 MPa higher" pressure and "2.5 MPa lower" pressure as described above, and can be set suitably.

Here, in the present embodiment, as shown by a characteristic line 35 in FIG. 2, at an initial stage of charging, fuel gas is supplied at the high increase rate (characteristic line 35A) which is higher than the reference increase rate, and while supplying majority of charged gas (middle and late stages of charging), charging is performed at the reference increase rate (characteristic line 35B). Then, when the pressure value detected by the secondary pressure sensor 19 reaches the target completion pressure (P target), the gas charging stops (completes). That is, gas charge is performed at the high increase rate from the beginning of the gas charge to the fuel tank 2A until the elapsed time (tc1), and after the time (tc1), gas is charged at the reference increase rate until it reaches the target completion pressure.

Thus, from the beginning of the gas charge to the time (tc1), it is possible to increase the flow rate of gas flowing to the downstream supply pipeline 5B and the charging hose 12. As a result, the temperature of the downstream supply pipeline 5B and the charging hose 12 which has risen due to the outside air temperature can be efficiently reduced within the time (tc1). Therefore, even when the temperature of the downstream supply pipeline 5B and the charging hose 12 has risen, after the time (tc1), the fuel gas which is cooled and controlled by the cooler 17 (heat exchanger 17B) can be supplied to the fuel tank 2A. Such gas charging of the present embodiment is performed by controlling the opening/closing of the flow regulating valve 16 by the control device 28.

Thereby, rising rate (OPRR) to be added to the reference increase rate for each sampling time, an initial value (OS0), and a maximum rising rate increase value (OSmax) are stored in the memory 29. In this case, the rising rate (OPRR), the initial value (OS0), and the maximum rising rate increase value (OSmax) are set based on the time (tc1) in order to bring the fuel gas supplied to the fuel tank 2A to a predetermined temperature.

As an example, the time (tc1) is set to about 30 seconds, and based on this setting, the rising rate (OPRR), the initial value (OS0), and the maximum rising rate increase value (OSmax) are determined by experiment, calculation, simulation, etc. In FIG. 2, the initial value (OS0) is set to "0". Further, the maximum rising rate increase value (OSmax) is set to a value not exceeding the allowable upper limit pressure (Pupper) when the gas supply is controlled at the reference increase rate (OSmax≤Pupper=7.0 MPa).

The charging control part 30 of the control device 28 switches from the high increase rate to the reference increase rate when gas charge to the fuel tank 2A is controlled at the maximum rising rate increase value (OSmax). In other words, as shown in FIG. 2, after the difference between "gas pressure in the fuel tank 2A when gas is charged at the high increase rate (Pc2)" and "gas pressure in the fuel tank 2A if gas were to be charged at the reference increase rate from the beginning (Pc1)" (Pc2−Pc1) reaches a predetermined pressure difference (that is, the maximum rising rate increase value), the charging control part 30 of the control device 28 performs gas charge to the fuel tank 2A at the reference increase rate until the time at which the target completion pressure is reached (tc2).

The gas charging device 1 according to the present embodiment is configured as described above. Next, control method for supplying fuel gas (hydrogen gas) to the fuel tank 2A of the vehicle 2 will be described.

The operator removes the nozzle 13 from the mounting part 24 and connects the nozzle 13 to the connection port 2B of the fuel tank 2A of the vehicle 2. Then, when the charging start switch 26A of the operation part 26 is operated, the flow regulating valve 16 and the shutoff valve 18 are opened, and fuel gas is supplied from the pressure accumulator 6 to the fuel tank 2A. In this case, the charging control part 30 of the control device 28 controls valve opening of the flow regulating valve 16 so that the pressure increase rate obtained from the pressure value detected by the secondary pressure sensor 19 matches a predetermined pressure rising rate.

Further, the control device 28 integrates the flow rate pulses from the flow meter 15 to calculate the charging amount (mass) of fuel, and closes the flow regulating valve 16 and the shutoff valve 18 to stop charging fuel when the charging amount of fuel reaches the predetermined target charging amount. Alternatively, the control device 28 closes the flow regulating valve 16 and the shutoff valve 18 to stop charging fuel when the pressure value of fuel gas detected by the secondary pressure sensor 19 reaches the predetermined target completion pressure (Ptarget). Further, when the charging stop switch 26B of the operation part 26 is operated, for example, even when the charging amount and the pressure value of fuel gas have not reached the target values, charging operation is forcibly stopped. That is, in this case, the flow regulating valve 16 and the shutoff valve 18 are closed by a signal from the control device 28.

Thereafter, the control device 28 opens the depressurization valve 22 to release fuel gas in the downstream supply pipeline 5B to the diffusion line 23, and closes the depressurization valve 22 after depressurizing the downstream supply pipeline 5B, the charging hose 12, and the nozzle 13. As a result, fuel gas in the downstream supply pipeline 5B is released to the diffusion line 23 and the pressure of the nozzle 13 is reduced to atmospheric pressure. Then, the operator releases connection between the nozzle 13 and the connection port 2B of the fuel tank 2A and returns the nozzle 13 to the mounting part 24 (stores it).

Incidentally, in the above-described prior art, temperature of the gas supply pipeline 5 (downstream supply pipeline 5B) and the charging hose 12 on the downstream side of the heat exchanger 17B may rise during standby due to the influence of the ambient temperature (outside temperature). In this case, in order to prevent charging efficiency to the fuel tank 2A from decreasing, it is desirable to set the temperature of fuel gas supplied to the fuel tank 2A to a predetermined temperature or lower within a predetermined time (for example, within 30 seconds) from the beginning of charging. However, when the outside air temperature is high and time interval from the completion of previous charging till the beginning of the present charging is long, the temperature of the downstream supply pipeline 5B and the charging hose 12 may rise. In this case, the temperature of fuel gas supplied to the fuel tank 2A cannot be lowered to a predetermined temperature within a predetermined time from the beginning of charging, and there is a risk that charging time may increase.

Therefore, in the present embodiment, as shown by the characteristic line 35 in FIG. 2, at the initial stage of charging fuel gas, fuel gas is supplied to the fuel tank 2A of the vehicle 2 at the high increase rate (characteristic line 35A) which is higher than the reference increase rate set by the outside temperature. Then, during middle and late stages of charging, fuel gas is supplied to the fuel tank 2A at the reference increase rate (characteristic line 35B).

In the following, the gas charge control processing by the control device 28 is described with reference to FIGS. 3 to 6. This control processing is repeatedly executed at predetermined intervals while the gas charging device 1 is in operation.

Figure 3:
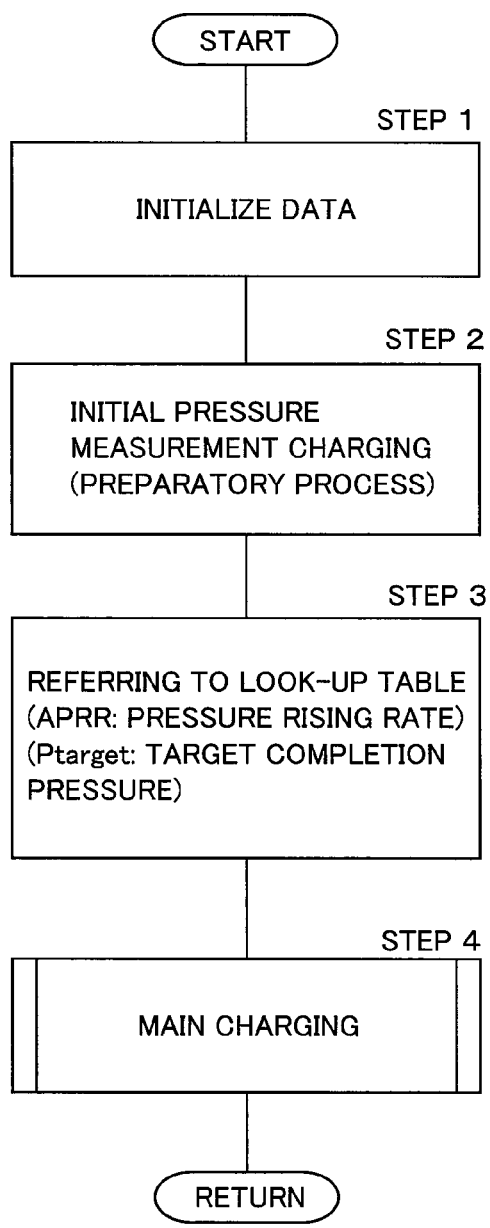
FIG. 3 is a flow chart showing control processing of gas supply performed by the control device in FIG. 1.

First, control processing of gas supply shown in FIG. 3 will be described. When processing operation starts, data initialization is performed in step 1. That is, when the charging start switch 26A of the operation part 26 is turned on, the control device 28 initializes data (the reference increase rate, the target completion pressure, etc.) obtained by the previous gas charging control, for example. In the next step 2, a preparatory process such as initial pressure measurement charging is performed. In this preparatory process such as the initial pressure measurement charging a small amount of gas is supplied to the fuel tank 2A prior to initiating gas charge to the fuel tank 2A. The control device 28 calculates the initial pressure (Pc0) inside the fuel tank 2A from the gas flow rate, gas pressure, etc. at that time, by estimation. Here, it is effective to increase as much as possible the amount of gas (integrated flow rate) to be supplied during this preparatory process, and it is more effective to supply an amount of preferably 50 grams or more, more preferably 120 grams or more and 200 grams or less.

In the next step 3, by referring to the look-up table, the reference increase rate (pressure rising rate: APRR) and the target completion pressure (P target) are determined. That is, by referring to the look-up table, the control device 28 determines the reference increase rate from the outside air temperature detected by the outside air temperature sensor 25, and determines the target completion pressure from the outside air temperature and the initial pressure (Pc0) inside the fuel tank 2A. Then, in the next step 4, main charging of fuel gas is performed. That is, the charging control part 30 of the control device 28 monitors the detected values of the primary pressure sensor 14, the secondary pressure sensor 19, the temperature sensor 20, etc., and supplies fuel gas to the fuel tank 2A of the vehicle 2.

Figure 4:
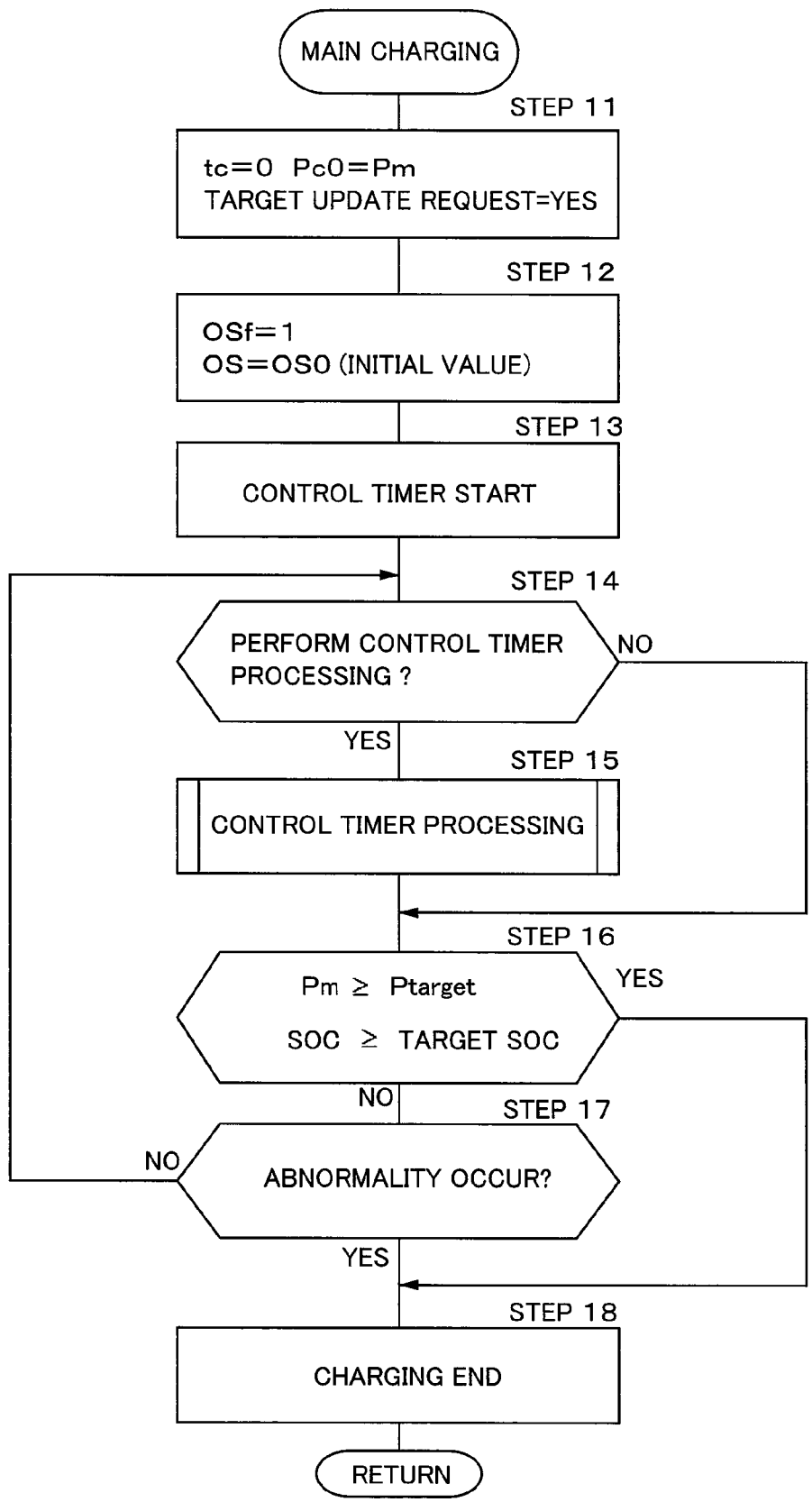
FIG. 4 is a flowchart showing main charging control processing in FIG. 3.

Next, the main charging control processing of fuel gas shown in FIG. 4 (process of step 4 shown in FIG. 3) will be described.

In step 11, main charging time (tc)=0, the main charging initial pressure (Pc0)=the charging pressure (Pm), target update request=YES, are set. The main charging time is the time during which constant rising rate control is performed while the target update request is set to "YES" (when the target update request is made) while excluding the non-charging time such as time spent to switch the bank (the pressure accumulator 6). In this embodiment, sampling time is set to 0.1 seconds, for example. Here, sampling time is not limited to 0.1 seconds and can be suitably set. Then, at the beginning of the main charging to the fuel tank 2A, the main charging time=0 (tc=0) is set.

The charging pressure is the detected value (pressure value) detected by the secondary pressure sensor 19, and at the beginning of the main charging, the initial pressure inside the fuel tank 2A becomes the charging pressure. The target update request becomes "YES" when target is generated with a constant rising rate, and becomes "NO" when the target pressure is not updated due to switching of the bank (pressure accumulator 6) etc. Therefore, at the beginning of the main charging, the target update request becomes "YES".

In the next step 12, a rising rate increase process flag (OSf)=1 and a rising rate increase value (OS)=a rising rate increase initial value (OS0) are set. The rising rate increase process flag is an instruction flag that determines whether or not to perform gas charge control at the high increase rate, which is a pressure increase rate higher than the reference increase rate obtained from the outside temperature by referring to the look-up table. When the rising rate increase process flag is set to "1", for example, the high increase rate control is performed, and when set to "0", the high increase rate control is not performed. Therefore, since the high increase rate control is performed at the beginning of the main charging, the rising rate increase process flag becomes "1". The rising rate increase value is an offset amount added to the target pressure as the rising rate increase from the reference increase rate. Thus, at the beginning of the main charging, the rising rate increase value is set to the rising rate increase initial value (for example, OS0=0 MPa).

In the next step 13, a control timer is started. That is, the charging control part 30 of the control device 28 starts the control timer for charging gas to the fuel tank 2A of the vehicle 2, and the process proceeds to the next step 14.

In step 14, it is determined whether or not control timer processing is to be performed. That is, the charging control part 30 of the control device 28 determines whether or not the time set as the sampling time (for example, 0.1 seconds) has elapsed. Then, when it is determined "YES" in step 14, that is, when it is determined that the time set as the sampling time has elapsed, then the process proceeds to step 15. On the other hand, when it is determined "NO" in step 14, that is, when it is determined that the time set as the sampling time has not elapsed, then the process proceeds to step 16.

In step 15, control timer processing is performed. That is, the charging control part 30 of the control device 28 performs control timer processing shown in FIG. 5, and the process proceeds to the next step 16. This control timer processing will be described later.

In step 16, it is determined whether or not the charging pressure (Pm) has reached the target completion pressure (Ptarget) (Pm Ptarget) and whether a charge rate has reached a target charge rate (SOC target SOC). That is, the charging control part 30 of the control device 28 determines whether or not the fuel tank 2A is sufficiently charged with gas by determining whether or not the charging pressure (Pm)

detected by the secondary pressure sensor 19 has reached the target completion pressure (Ptarget) during gas charge. Further, the charging control part 30 determines whether or not the charge rate in the fuel tank 2A has reached the charge rate which indicates the predetermined full tank state of the fuel tank 2A. In this case, the charge rate is expressed as a ratio of amount of charge, for example, 70 MPa at 15° C. being expressed as 100%.

Then, when it is determined "NO" in step 16, that is, when it is determined that the charging pressure has not reached the target completion pressure and when the charge rate has not reached the target charge rate, then the process proceeds to step 17. On the other hand, when it is determined "YES" in step 16, that is, when it is determined that the charging pressure has reached the target completion pressure or when the charge rate has reached the target charge rate, then the process proceeds to step 18.

In step 17, it is determined whether or not an abnormality exists. That is, the control device 28 determines whether or not an abnormality has occurred during gas charge to the fuel tank 2A. Then, when it is determined "NO" in step 17, that is, when it is determined that abnormality has not occurred, then the process returns to step 14. On the other hand, when it is determined "YES" in step 17, that is, when it is determined that abnormality has occurred, then the process proceeds to step 18 and gas charge to the fuel tank 2A ends, and the process returns.

Figure 5:
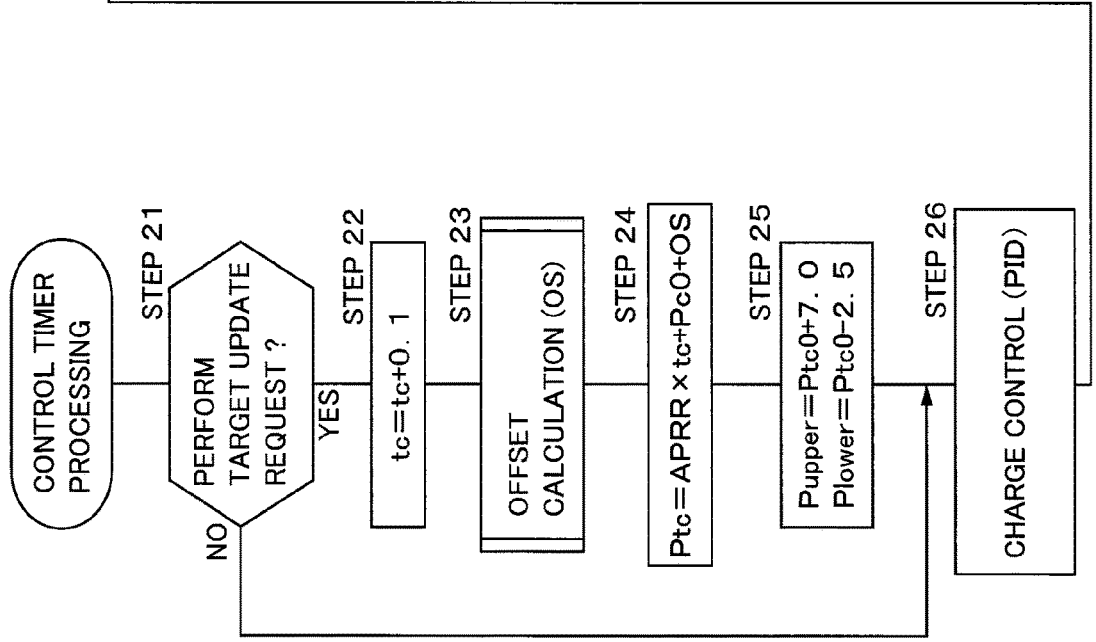
FIG. 5 is a flowchart showing control timer processing in FIG. 4.

Next, the control timer processing shown in FIG. 5 (process of step 15 shown in FIG. 4) will be described.

In step 21, it is determined whether or not the target update request is to be performed. That is, the charging control part 30 of the control device 28 determines whether or not target generation is to be performed with a constant increase rate (rising rate) of gas supply. Then, when it is determined "YES" in step 21, that is, when it is determined that target generation is to be performed with a constant increase rate (rising rate) of gas supply, then the process proceeds to a step 22. On the other hand, when it is determined "NO" in step 21, that is, when the target pressure is not updated due to switching the pressure accumulator 6 or the like, then the process proceeds to step 26.

In step 22, sampling time is added to the main charging time (tc=tc+0.1), and the process proceeds to the next step 23, in which offset calculation (OS) control processing is performed. The control processing of this offset calculation will be described later.

In the next step 24, target pressure (Ptc) is calculated. That is, the charging control part 30 of the control device 28 calculates the target pressure (Ptc) of every moment (for every sampling time) by using the following Formula 1 based on the reference increase rate (APRR), the main charging time (tc), the main charging initial pressure (Pc0), and the rising rate increase value (OS), and the process proceeds to the next step 25.

$$Ptc = APRR \times tc + Pc0 + OS \quad \text{[Formula 1]}$$

In the next step 25, the allowable upper limit pressure (Pupper) and the allowable lower limit pressure (Plower) are determined. That is, the charging control part 30 of the control device 28 calculates the upper limit value and the lower limit value of pressure control during the gas charge control from the target pressure (Ptc0) of every moment when applying the above Formula 1 with OS=0. That is, the allowable upper limit pressure (Pupper) and the allowable lower limit pressure (Plower) are calculated based on the target pressure (Ptc0) of every moment if the pressure control were to be performed at the reference increase rate from the beginning of gas charge (phantom line 32 in FIG. 2). The value of the allowable upper limit pressure can be set, for example, by adding 7.0 MPa to the target pressure (Ptc0) (Pupper=Ptc0+7.0). On the other hand, the value of the allowable lower limit pressure can be set, for example, by subtracting 2.5 MPa from Ptc0 (Plower=Ptc0−2.5).

In the next step 26, charge control is performed. That is, the charging control part 30 of the control device 28 performs, by PID control for example, feedback control so that the charging pressure (Pm) detected by the secondary pressure sensor 19 becomes the target pressure (Ptc), and the process proceeds to the next step 27.

In step 27, it is determined whether or not the charging pressure (Pm) is equal to or higher than the allowable upper limit pressure (Pupper) (Pm≥Pupper). That is, while fuel gas charge control is being performed, the abnormality detecting part 31 of the control device 28 determines whether or not the charging pressure (Pm) detected by the secondary pressure sensor 19 exceeds the target pressure (Ptc) and is equal to or higher than the allowable upper limit pressure (Pupper). And, when it is determined "NO" in step 27, that is, when it is determined that the charging pressure is not equal to nor higher than the allowable upper limit pressure, then the process proceeds to step 28. On the other hand, when it is determined "YES" in step 27, that is, when it is determined that the charging pressure is equal to or higher than the allowable upper limit pressure, then the process proceeds to step 31.

In step 28, it is determined whether or not the charging pressure (Pm) is equal to or lower than the allowable lower limit pressure (Plower) (Pm Plower). That is, while the fuel gas charge control is being performed, the abnormality detecting part 31 of the control device 28 determines whether or not the charging pressure (Pm) detected by the secondary pressure sensor 19 does not reach the target pressure (Ptc) and is equal to or lower than the allowable lower limit pressure (Plower). And, when it is determined "NO" in step 28, that is, when it is determined that the charging pressure is not equal to nor lower than the allowable lower limit pressure, then the process proceeds to step 29. On the other hand, when it is determined "YES" in step 28, that is, when it is determined that the charging pressure is equal to or higher than the allowable lower limit pressure, then the process proceeds to step 31.

In step 29, it is determined whether or not the target pressure is equal to or higher than the target completion pressure (Ptc≥Ptarget). That is, the charging control part 30 of the control device 28 determines whether or not the target pressure (Ptc) calculated in step 24 is equal to or higher than the target completion pressure (Ptarget) which is determined by referring to the look-up table based on the outside temperature and the initial pressure (Pc0) in the fuel tank 2A at the beginning of gas charge. And, when it is determined "YES" in step 29, that is, when it is determined that the target pressure is equal to or higher than the target completion pressure, then the process proceeds to step 30, and the target pressure (Ptc) is set to the target completion pressure (Ptarget). Further, in order not to update the target pressure, the target update request is set to "NO" and the process returns.

In step 31, rising rate abnormality processing is performed. That is, the charging control part 30 of the control device 28 performs abnormality processing when an abnormality is detected by the abnormality detecting part 31 (that is, when an abnormality occurs in the gas charge control). This rising rate abnormality processing can be controlled to switch charge rate to the fuel tank 2A from the high increase rate to the reference increase rate, when gas charge to the fuel tank 2A is controlled at the high increase rate, for example. Further, this rising rate abnormality processing control may be performed to stop gas charge to the fuel tank 2A, for example. In this case, an alarm sound may be generated from an alarm device (not shown) provided in the dispenser housing 4A, or the occurance of abnormality may be indicated on the indicator 27. Then, after the rising rate abnormality processing is performed, the process returns.

Next, offset calculation processing (process of step 23 in FIG. 5) shown in FIG. 6 will be described.

In step 41, the rising rate increase process flag (OSf) is set to "1". That is, the charging control part 30 of the control device 28 raises an offset flag (OSf=1) in order to control at the high increase rate which has a pressure increase rate higher than the reference increase rate at the beginning of gas charge to the fuel tank 2A, and the process proceeds to the next step 42.

In step 42, the rising rate increase value (OS) is calculated. That is, the charging control part 30 of the control device 28 calculates the rising rate increase value (OS) used for the calculation of the target pressure (Ptc) of every moment from the following Formula 2. That is, the rising rate (OPRR) is added to the rising rate increase value of the previous sampling time to determine the present rising rate increase value, and the process proceeds to the next step 43.

$$OS=OS+OPRR \qquad \text{[Formula 2]}$$

In step 43, it is determined whether or not the rising rate increase value (OS) is equal to or greater than the maximum rising rate increase value (OSmax) (OS≥OSmax). That is, the charging control part 30 of the control device 28 determines whether or not the rising rate increase value which is added in accordance with the lapse of time (every sampling time) while supplying gas to the fuel tank 2A has reached the maximum rising rate increase value.

Then, when it is determined "NO" in step 43, that is, when it is determined that the rising rate increase value is not equal to nor greater than the maximum rising rate increase value, then the process returns. On the other hand, when it is determined "YES" in step 43, that is, when it is determined that that the rising rate increase value is equal to or greater than the maximum rising rate increase value, then the process proceeds to step 44.

In step 44, the rising rate increase value (OS) is set to the maximum rising rate increase value (OSmax) (OS=OSmax). Further, the rising rate increase process flag (OSf) is set to "0" (OSf=0). That is, the charging control part 30 of the control device 28 switches the rising rate increase process flag from "1" to "0" in order to switch gas supply to the fuel tank 2A from the high increase rate to the reference increase rate. Then, the charging control part 30 of the control device 28 sets the rising rate increase value (OS) to the maximum rising rate increase value (OSmax) in order to fix the rising rate increase value (OS) of the target pressure (Ptc) calculated in step 24 in FIG. 5 to the maximum rising rate increase value (OSmax), and the process returns.

That is, when controlled at the high increase rate, the charging control part 30 of the control device 28 calculates the target pressure (Ptc) by adding the rising rate (OPRR) for each sampling time, from the initial value (OS0) till the maximum rising rate increase value (OSmax), to the rising rate increase value (OS) of the above-described Formula 1. On the other hand, when switched from the high increase rate to the reference increase rate, the charging control part 30 of the control device 28 calculates the target pressure (Ptc) by fixing the rising rate increase value (OS) in the above-described Formula 1 to the maximum rising rate increase value (OSmax).

Thus, in the present embodiment, during the initial stage of gas charging to the fuel tank 2A of the vehicle 2, gas is supplied at the high increase rate, which is a pressure increase rate higher than the reference increase rate set by the outside temperature, and during the middle and final stages of gas charging, gas is supplied at the reference increase rate. Therefore, during the initial stage of gas charging to the fuel tank 2A, since fuel gas flowing to the downstream supply pipeline 5B and the charging hose 12 can be increased, the increased temperature of the downstream supply pipeline 5B and the charging hose 12 due to the influence of the outside temperature can be cooled efficiently. As a result, since the temperature of fuel gas supplied to the fuel tank 2A can be reduced to a predetermined temperature or lower within a predetermined time from the beginning of the fuel gas charge, gas charging time can be shortened.

Further, the charging control part 30 of the control device 28 switches from the high increase rate to the reference increase rate when the rising rate increase value (OS) reaches the maximum rising rate increase value (OSmax). In this case, since the maximum rising rate increase value is set equal to or lower than the allowable upper limit pressure (Pupper), exceeding the allowable upper limit pressure is suppressed even when gas charging is performed at the high increase rate, and the fuel tank 2A, the gas supply pipeline 5, and the charging hose 12 are suppressed from being excessively pressurized.

Further, when the pressure value detected by the secondary pressure sensor 19 reaches a predetermined pressure value (for example, an allowable upper limit pressure or an allowable lower limit pressure), the abnormality detecting part 31 of the control device 28 detects that gas charging to the fuel tank 2A is abnormal. Then, when the abnormality detecting part 31 detects an abnormality, the charging control part 30 of the control device 28 switches from the high increase rate to the reference increase rate or stops gas charging to the fuel tank 2A. As a result, it is possible to suppress excessive pressure from being applied to the fuel tank 2A, the gas supply pipeline 5, and the charging hose 12, or to suppress shortage of gas supply to the fuel tank 2A.

Figure 7:
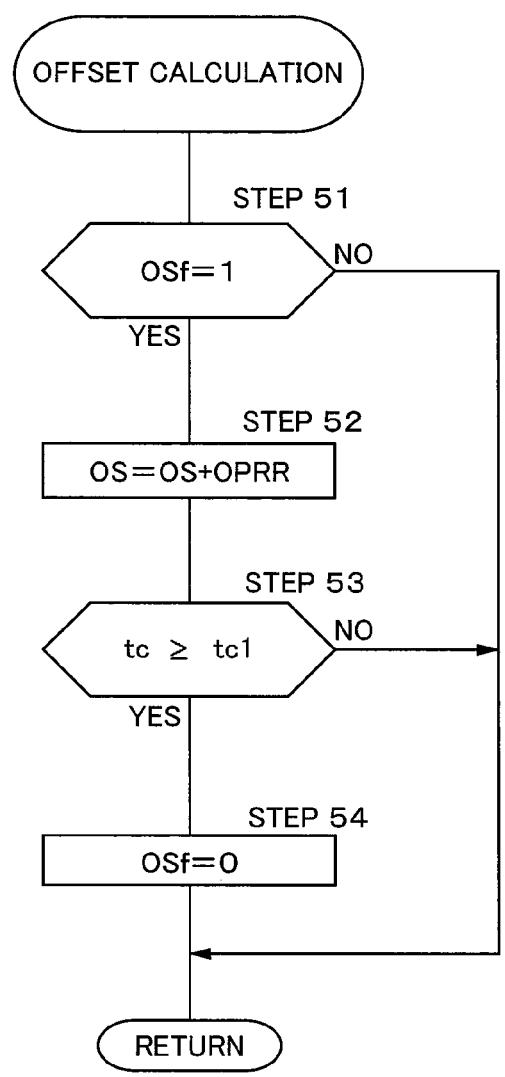
FIG. 7 is a flow chart showing offset calculation control processing according to the second embodiment.

Next, FIG. 7 shows the second embodiment. The feature of the second embodiment is that the high increase rate is switched to the reference increase rate when a predetermined time (tc1) elapses from the beginning of gas charge. Here, in the second embodiment, same components as those in the first embodiment are designated by the same reference numerals, and the description thereof are omitted.

Figure 6:
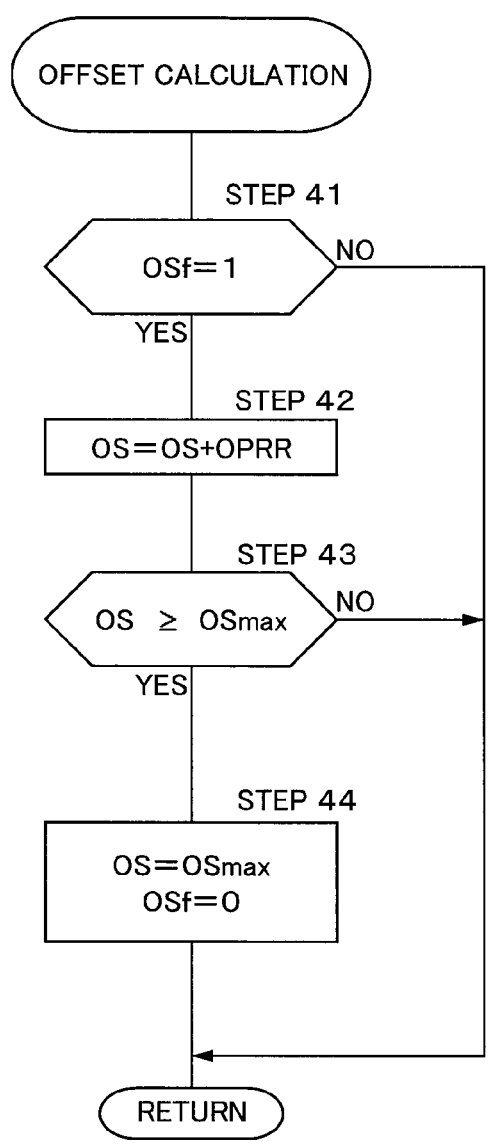
FIG. 6 is a flow chart showing offset calculation control processing in FIG. 5.

In this case, instead of the offset calculation control processing in FIG. 6 according to the first embodiment, the offset calculation control processing shown in FIG. 7 is used.

That is, step 51 and step 52 in FIG. 7 are controlled in the same manner as step 41 and step 42 in FIG. 6. Further, in step 53, it is determined whether or not the main charging time (tc) has exceeded the end time of rising rate increase (tc1) (tc tc1). That is, the charging control part 30 of the control device 28 determines whether or not the main charging time added in step 22 in FIG. 5 has exceeded the predetermined end time of rising rate increase (tc1).

Therefore, the end time of rising rate increase is a predetermined time period (a threshold value) from the time of gas charge with increased rising rate (at the high increase rate) till the time to switch gas charge rate to the reference increase rate. In other words, the end time of rising rate increase is the time from the beginning of gas charge till the end thereof at the high increase rate which is contained (stored) in the memory 29 in advance.

The end time of rising rate increase is set, for example, to about 30 seconds (preferably 20 to 35 seconds, more preferably 25 to 30 seconds) obtained by experiment, calculation, simulation, etc., so that gas pressure detected by the secondary pressure sensor 19 does not exceed the allowable upper limit pressure (Pupper) during gas charge at the high increase rate.

Then, when it is determined "NO" in step 53, that is, when it is determined that the main charging time (tc) has not exceeded the end time of rising rate increase (tc1), then the process returns. On the other hand, when it is determined that the main charging time (tc) has exceeded the end time of rising rate increase (tc1), then the process proceeds to step 54.

In step 54, the rising rate increase process flag (OSf) is set to "0" (OSf=0). That is, the charging control part 30 of the control device 28 switches the rising rate increase process flag from "1" to "0" in order to switch supply of gas to the fuel tank 2A from the high increase rate to the reference increase rate. Further, the rising rate increase value (OS) when the main charging time reaches the end time of rising rate increase is set as a fixed value, and thereafter (while controlled at the reference increase rate), the target pressure (Ptc) is calculated in step 24 shown in FIG. 5, and the process returns.

Thus, also in the second embodiment, the same advantageous effect as that in the first embodiment can be achieved. In particular, in the second embodiment, the high increase rate is switched to the reference increase rate with the elapse of time from the beginning of gas charge to the fuel tank 2A. This makes it easy to recognize whether gas supply to the fuel tank 2A is being controlled at the high increase rate or the reference increase rate.

Here, in the above-described first embodiment, a case has been described where the rising rate increase value (OS), the initial value (OS0), and the maximum rising rate increase value (OSmax) are contained (stored) in the memory 29 in advance. However, the present invention is not limited thereto, and for example, a detected value (temperature) detected by the temperature sensor 20 prior to the beginning of charging and a table or a formula corresponding to the elapsed time from the previous gas supply may be stored in the memory 29, and the rising rate increase value (OS), the initial value (OS0), and the maximum rising rate increase value (OSmax) may be set by referring to the stored table or the formula. This also applies to the end time of rising rate increase (tc1) in the second embodiment.

Further, in the above-described first embodiment, a case has been described where gas charge to the fuel tank 2A is controlled by a non-communication charge in which communication control is not performed between the fuel tank 2A of the vehicle 2 and the dispenser unit 4. However, the present invention is not limited thereto, and for example, communication control may be performed in which the condition of the fuel tank 2A of the vehicle 2 is being transmitted to the dispenser unit 4. That is, in the first embodiment, a case has been described where gas pressure in the fuel tank 2A of the vehicle 2 is measured using the detected value of the secondary pressure sensor 19 provided in the downstream supply pipeline 5B, as an example. However, the present invention is not limited thereto, and gas charging control may be performed by providing a pressure sensor for detecting gas pressure in the fuel tank 2A of the vehicle 2, and transmitting the detected value of the pressure sensor to the control device 28 of the dispenser unit 4. This also applies to the second embodiment.

Further, in the above-described first embodiment, a case has been described where the abnormality detecting part 31 of the control device 28 determines that gas charging to the fuel tank 2A is determined to be abnormal when the pressure value detected by the secondary pressure sensor 19 reaches the allowable upper limit pressure (Pupper) or the allowable lower limit pressure (Plower). However, the present invention is not limited thereto, and for example, the abnormality detecting part 31 of the control device 28 may set a pressure lower than the allowable upper limit pressure (between the allowable upper limit pressure and the pressure value at the maximum rising rate increase value) as a predetermined pressure value. Similarly, a pressure higher than the allowable lower limit pressure may be set as the predetermined pressure value. This also applies to the second embodiment.

Further, in the above-described first embodiment, a case has been described where the charging control part 30 of the control device 28 switches from the high increase rate to the reference increase rate and stops gas charging when abnormality detecting part 31 detects an abnormality. However, the present invention is not limited thereto, and for example, the charging control part 30 of the control device 28 may first perform control to switch from the high increase rate to the reference increase rate, and then perform control to stop gas charging when the secondary pressure sensor 19 detects a higher pressure value. This also applies to the second embodiment.

Further, in the above-described second embodiment, a case has been described where the charging control part 30 switches from the high increase rate to the reference increase rate when the predetermined time (tc1) has elapsed from the beginning of gas charge to the fuel tank 2A. However, the present invention is not limited thereto, and for example, instead of switching from the high increase rate to the reference increase when the predetermined time (tc1) has elapsed from the beginning of gas charge to the fuel tank 2A, switching may be performed when the secondary pressure sensor 19 detects an assumed pressure assumed to be detected by the secondary pressure sensor 19 when the predetermined time (tc1) has elapsed from the beginning of gas charge to the fuel tank 2A.

In this case, the assumed pressure is a pressure threshold that switches gas charge to the fuel tank 2A from the high increase rate to the reference increase rate, and is set so as not to exceed the allowable upper limit pressure (Pupper). That is, the assumed pressure is determined by the initial pressure (Pc0) calculated in the preparatory process such as the initial pressure measurement charging in step 2 as the rising rate increase end pressure, and while corresponding to each initial pressure (Pc0), is contained (stored) in advance in the memory 29 of the control device 28.

Further, in the above-described first embodiment, gas charge to the fuel tank 2A is performed at the high increase rate from the beginning of gas charge until a predetermined time (tc1) has elapsed. Further, in the above-described second embodiment, gas charge to the fuel tank 2A is performed at the high increase rate from the beginning of gas charge until a predetermined time (tc1) has elapsed, or from the beginning of gas charge until when the pressure sensor 19 detects an assumed pressure assumed to be detected by the pressure sensor 19 when the predetermined time (tc1) has elapsed. Then, while gas charge is performed at the high increase rate, for example, consider a case where pressure detected by the pressure sensor 19 is reduced to the lower limit pressure (Plower) as a result of being unable to maintain gas charging at the high increase rate due to the reduction of gas pressure in the pressure accumulator 6 as gas charging progresses. In this case, by determining "YES" in step 28 of FIG. 5, the process proceeds to rising rate abnormality processing in step 31. However, as described above, the cause of not being able to maintain gas charge at the high increase rate is due to the reduction in the gas pressure in the pressure accumulator 6, and is not due to an abnormality in gas charge control. In this case, even when it is determined "YES" in step 28 of FIG. 5, the process may proceed to step 29. That is, the process of step 28 itself may be omitted. With such a configuration, more gas inside the pressure accumulator 6 can be charged to the fuel tank 2A.

As a gas charging device based on the embodiments described above, for example, the following aspects can be considered.

As the first aspect, a gas charging device including: a nozzle connected to a pressure accumulator which stores a gas via a gas supply system, the nozzle being intended to charge the gas to a tank to be charged; a control valve provided in the gas supply system to control flow of the gas to the tank to be charged; a cooler provided in the gas supply system for cooling the gas charged to the tank to be charged by the nozzle; a pressure sensor configured to detect either one of a gas pressure in the tank to be charged or a gas pressure downstream of the control valve of the gas supply system; a control device configured to control opening/closing of the control valve so that pressure increase rate of the gas pressure increases at a reference increase rate determined in advance, the gas pressure being detected by the pressure sensor when the tank to be charged is charged; where, when gas charging to the tank to be charged begins, the control device controls the opening/closing of the control valve so that the tank to be charged is gas charged such that the pressure increase rate becomes a high increase rate that is higher than the reference increase rate; and after a difference between the gas pressure detected by the pressure sensor when gas charging at the high increase rate and the gas pressure detected by the pressure sensor when gas charging at the reference increase rate reaches a predetermined pressure difference, the control device controls the opening/closing of the control valve so that the tank to be charged is gas charged at the reference increase rate.

As the second aspect, a gas charging device including: a nozzle connected to a pressure accumulator which stores a gas via a gas supply system, the nozzle being intended to charge the gas to a tank to be charged; a control valve provided in the gas supply system to control flow of the gas to the tank to be charged; a cooler provided in the gas supply system for cooling the gas charged to the tank to be charged by the nozzle; a pressure sensor configured to detect either one of a gas pressure in the tank to be charged or a gas pressure downstream of the control valve of the gas supply system; a control device configured to control opening/closing of the control valve so that pressure increase rate of the gas pressure detected by the pressure sensor when the tank to be charged is charged increases at a reference increase rate determined in advance; where, from the time when gas charging to the tank to be charged begins until a predetermined time elapses or until the pressure sensor detects an assumed pressure that is assumed to be detected by the pressure sensor when the predetermined time has elapsed, the control device controls the opening/closing of the control valve so that the tank to be charged is gas charged such that the pressure increase rate becomes a high increase rate that is higher than the reference increase rate; and after the predetermined time has elapsed or after detecting the assumed pressure, the control device controls the opening/closing of the control valve so that the tank to be charged is gas charged at the reference increase rate.

As the third aspect, the gas charging device according to the first aspect or the second aspect, where the control device is configured to detect an abnormality of gas charge to the tank to be charged when the gas pressure detected by the pressure sensor reaches a predetermined pressure value.

As the fourth aspect, the gas charging device according to the third aspect, where the control device is configured to switch gas charge to the tank to be charged from the high increase rate to the reference increase rate when the control device detects the abnormality of gas charge to the tank to be charged.

As the fifth aspect, the gas charging device according to the third aspect, where the control device is configured to stop gas charge to the tank to be charged when the control device detects the abnormality of gas charge to the tank to be charged.

Although a number of embodiments of the present invention have been described, it should be noted that the present invention is not limited thereto, and various modifications are included therein. For example, the above-described embodiments have been explained in detail in order to describe the present invention in an easy-to-understand manner, and the present invention is not necessarily limited to having all the configurations described in the embodiments. Further, a portion of a configuration of one embodiment can be replaced with a configuration of another embodiment, or a configuration of another embodiment can be added to a configuration of one embodiment. Further, with regard to a part of a configuration of each of the embodiments, another configuration can be added, deleted, or replaced with.

The present application claims priority based on Japanese Patent Application No. 2018-086740 filed on Apr. 27, 2018. The entire disclosure of Japanese Patent Application No. 2018-086740, filed Apr. 27, 2018, which includes the specification, claims, drawings and abstract, is incorporated herein by reference in its entirety.

DESCRIPTION OF REFERENCE NUMERALS

1: Gas charging device
2: Vehicle
2A: Fuel tank (Tank to be charged)
5: Gas supply pipeline (Gas supply system)
6: Pressure accumulator
13: Nozzle
16: Flow regulating valve (Control valve)
17: Cooler
19: Secondary pressure sensor (Pressure sensor)
28: Control device
31: Abnormality detecting part

The invention claimed is:

1. A gas charging device, comprising:
a nozzle connected to a pressure accumulator which stores a gas via a gas supply system, the nozzle being intended to charge the gas to a tank to be charged;
a control valve provided in the gas supply system to control flow of the gas to the tank to be charged;
a cooler provided in the gas supply system to cool the gas charged to the tank to be charged by the nozzle;
a pressure sensor configured to detect either one of a gas pressure in the tank to be charged or a gas pressure downstream of the control valve of the gas supply system; and a control device configured to control opening/closing of the control valve so that pressure increase rate of the gas pressure increases at a reference increase rate determined in advance, the gas pressure being detected by the pressure sensor when the tank to be charged is charged;

wherein, the control device performs main charging after a preparatory process including initial pressure measurement charging to measure the initial pressure of the tank to be charged by supplying the gas to the tank to be charged, when the main charging to the tank to be charged begins, the control device controls the opening/closing of the control valve so that the tank to be charged is gas charged such that the pressure increase rate becomes a high increase rate, which is higher than the reference increase rate, after a difference between the gas pressure detected by the pressure sensor when gas charging at the high increase rate and the gas pressure detected by the pressure sensor when gas charging at the reference increase rate reaches a predetermined pressure difference, the control device controls the opening/closing of the control valve so that the tank to be charged is gas charged at the reference increase rate, which is lower than the high increase rate, while maintaining the predetermined pressure difference until a target completion pressure is reached, during an initial charging stage at the high increase rate, from an initial start time (tc0) to a rate change time (tc1), a difference in pressure between gas pressure measured in the tank to an allowable upper limit gas pressure steadily decreases to the predetermined pressure difference, which is greater than zero, and during a following charging stage at the reference increase rate, from the rate change time (tc1) to a rate end time (tc2), the difference in pressure between gas pressure measured in the tank to the allowable upper limit gas pressure remains constant and is substantially less than gas pressure measured in the tank to the allowable lower limit pressure.

2. A gas charging device, comprising:

a nozzle connected to a pressure accumulator which stores a gas via a gas supply system, the nozzle being intended to charge the gas to a tank to be charged;

a control valve provided in the gas supply system to control flow of the gas to the tank to be charged;

a cooler provided in the gas supply system to cool the gas charged to the tank to be charged by the nozzle;

a pressure sensor configured to detect either one of a gas pressure in the tank to be charged or a gas pressure downstream of the control valve of the gas supply system; and a control device configured to control opening/closing of the control valve so that pressure increase rate of the gas pressure detected by the pressure sensor when the tank to be charged is charged increases at a reference increase rate determined in advance;

wherein, the control device performs main charging after a preparatory process including initial pressure measurement charging to measure the initial pressure of the tank to be charged by supplying the gas to the tank to be charged, from the time when the main charging to the tank to be charged begins (tc0) until a predetermined time (tc1) elapses, the control device controls the opening/closing of the control valve so that the tank to be charged is gas charged such that the pressure increase rate becomes a high increase rate, which is higher than the reference increase rate, after the predetermined time (tc1) has elapsed, the control device controls the opening/closing of the control valve so that the tank to be charged is gas charged at the reference increase rate, which is lower than the high increase rate, until a target completion pressure is reached when charging is performed at the reference increase rate, during an initial charging stage at the high increase rate, from the time when the main charging to the tank to be charged begins (tc0) until the predetermined time (tc1) elapses, a difference in pressure between gas pressure measured in the tank to an allowable upper limit gas pressure steadily decreases to a predetermined pressure difference, which is greater than zero, and during a following charging stage at the reference increase rate, from the predetermined time (tc1) until the target completion pressure is reached (tc2), the difference in pressure between gas pressure measured in the tank to the allowable upper limit gas pressure remains constant and is substantially less than gas pressure measured in the tank to the allowable lower limit pressure.

3. The gas charging device according to claim 1, wherein the control device is configured to detect an abnormality of gas charge to the tank to be charged when the gas pressure detected by the pressure sensor reaches a predetermined pressure value.

4. The gas charging device according to claim 3, wherein the control device is configured to switch gas charge to the tank to be charged from the high increase rate to the reference increase rate when the control device detects the abnormality of gas charge to the tank to be charged.

5. The gas charging device according to claim 3, wherein the control device is configured to stop gas charge to the tank to be charged when the control device detects the abnormality of gas charge to the tank to be charged.

6. The gas charging device according to claim 2, wherein the control device is configured to detect an abnormality of gas charge to the tank to be charged when the gas pressure detected by the pressure sensor reaches a predetermined pressure value.

7. The gas charging device according to claim 6, wherein the control device is configured to switch gas charge to the tank to be charged from the high increase rate to the reference increase rate when the control device detects the abnormality of gas charge to the tank to be charged.

8. The gas charging device according to claim 6, wherein the control device is configured to stop gas charge to the tank to be charged when the control device detects the abnormality of gas charge to the tank to be charged.

9. The gas charging device according to claim 1, further comprising:

a temperature sensor configured to detect ambient air temperature in proximity to the gas charging device, wherein the control device determines the reference increase rate by referring to a look-up table in a memory based on detected ambient air temperature, and determines the target completion pressure by referring to the look-up table based on the detected ambient air temperature and an initial pressure inside the tank.

10. The gas charging device according to claim 2, further comprising:
a temperature sensor configured to detect ambient air temperature in proximity to the gas charging device,
wherein the control device determines the reference increase rate by referring to a look-up table in a memory based on detected ambient air temperature, and determines the target completion pressure by referring to the look-up table based on the detected ambient air temperature and an initial pressure inside the tank.

11. The gas charging device according to claim 1, further comprising:
a maximum rising rate increase value (OSmax), which is the predetermined pressure difference, is set to a value not exceeding the allowable upper limit pressure (Pupper) when the gas supply is controlled at the reference increase rate.

12. The gas charging device according to claim 1, further comprising:
when a time beginning of the main charging is 0, and a time switching from the high increase rate to the reference increase rate is tc1,
the tc1 is 20 to 35 seconds.

13. The gas charging device according to claim 2, further comprising:
the predetermined time (tc1) is 20 to 35 seconds.

* * * * *